May 22, 1923.  1,456,438
K. J. E. HESSELMAN
LIQUID FILTER
Filed July 28, 1922
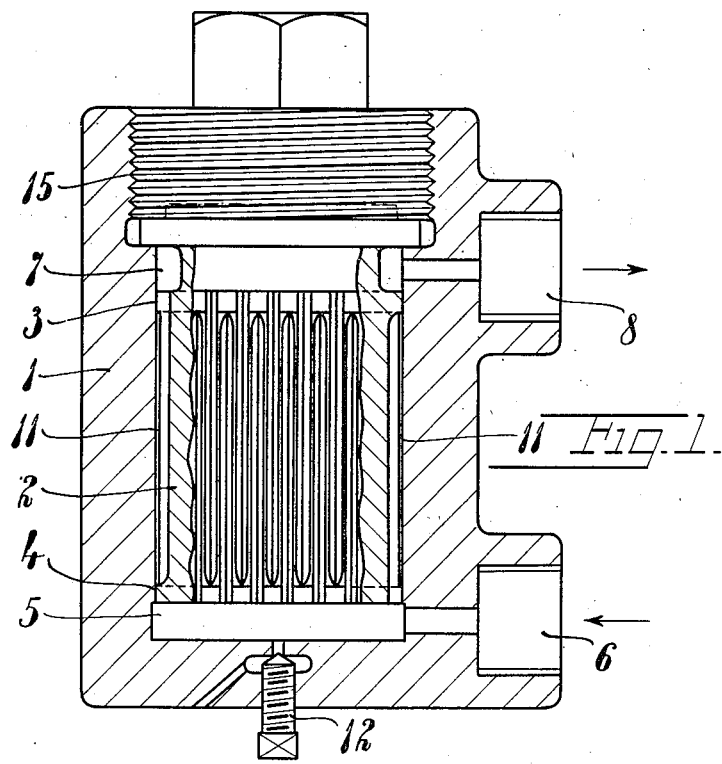
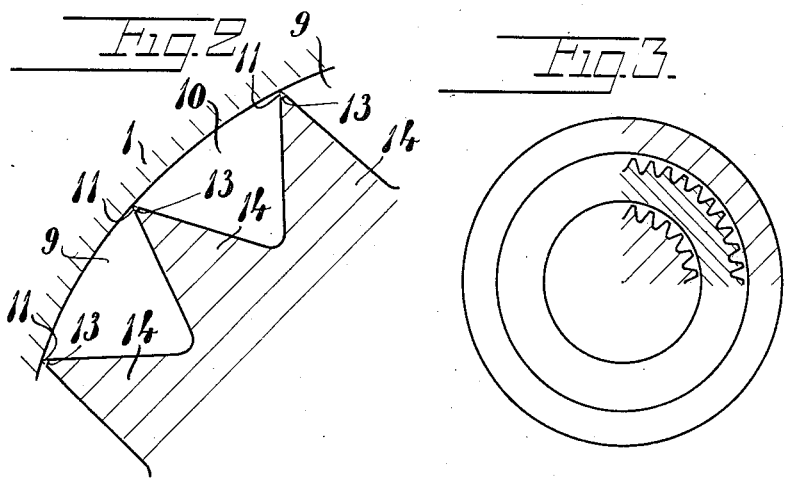
Inventor.
Knut J. E. Hesselman, Patented May 22, 1923.

1,456,438

UNITED STATES PATENT OFFICE.

KNUT JONAS ELIAS HESSELMAN, OF SALTSJO-STORANGEN, SWEDEN.

LIQUID FILTER.

Application filed July 28, 1922. Serial No. 578,253.

*To all whom it may concern:*

Be it known that I, KNUT JONAS ELIAS HESSELMAN, a citizen of the Kingdom of Sweden, residing at Saltsjo - Storangen, Sweden, have invented new and useful Improvements in Liquid Filters, of which the following is a specification.

One of the most important requirements that must be satisfied in order that an internal combustion oil engine using direct injection of the fuel oil may operate satisfactorily is that the oil is properly filtered so that even the smallest impurities are removed before the oil enters the fuel supply pump and the fuel valves, particularly in case the latters are constructed to resist high pressures which may sometimes amount to several hundreds of atmospheres. A filter consisting of a wire fabric cannot be used for this purpose, as it may be crushed owing to the high pressure and parts thereof may enter the pump and cause the valves not to seat properly. Special filter designs using no wire fabric have also been proposed, such constructions, however, have not enabled the filtration to proceed to the degree that is desirable in this connection and, furthermore, the manufacture of such constructions is expensive and the cleaning thereof difficult.

This invention refers to filters of that kind including a plug-shaped member fitted into a casing and formed with external grooves, alternately connected with an inlet and an outlet and communicating with each other through narrow openings. The invention has for its object to appropriately design the said narrow openings between the grooves in order to make the manufacture of the filter cheap and simple and to enable the filtration to be extended to any desired degree and to facilitate the cleaning of the filter.

The invention is characterized, chiefly, in this that the said communication openings between the inlet and outlet grooves formed in the plug-shaped member are obtained by turning off the partition walls between the grooves to such an extent as to form narrow openings between the peripheral edge of said partition walls and the inner wall of the casing surrounding the plug-shaped member.

In the accompanying drawing two embodiments of filters are shown to exemplify this invention. Fig. 1 is a longitudinal section of one embodiment. Fig. 2 is a cross section of part of the same embodiment shown on a larger scale. Fig. 3 is a cross section of the other embodiment.

Inserted into a cylindrical boring in a casing 1 is a cylindrical, plug-shaped member 2 closely fitting in said boring at 3 and 4, as shown in Fig. 1. The plug 2 ends with its inner end at a certain distance from the bottom of the said boring so as to leave a space 5 between it and the said bottom. Extending from said space through the wall of the casing 1 is a boring or opening 6. Provided in the plug 2 above the closely fitting part 3 is an annular groove forming between it and the wall of the boring in the casing a space 7 extending all around the plug. Extending from this space through the wall of the casing is a boring or opening 8. The plug 2 is formed with a plurality of, preferably, axially extending grooves on its outer surface. Every other of said grooves 9, opens into the space 5 and ends at a certain distance from the space 7, while the other grooves 10, open into the space 7 and end at a certain distance from the space 5. Between the guiding surfaces 3 and 4, the plug member 2 is ground so as to form a narrow air space 11 between the wall of the boring in the casing 1 and the peripheral edge of each partition between two adjacent grooves 9 and 10. Said air space 11 may evidently be made as narrow as may be desired. Practical experiments have shown that a width of said air space amounting to 15/1000 or 20/1000 mm. is preferred and is required to obtain an effective filtration. The oil to be filtrated is introduced, for instance, through the opening 6 and fills the space 5 as well as the grooves 9 and passes from the latters by way of the air spaces 11 into the grooves 10 to fill the space 7 and escape through the opening 8. Evidently, in the passage described all impurities having a cross dimension greater than that of the air space 11 will be retained in the grooves 9, that is in the case assumed, all impurities having a cross dimension greater than 15/1000 or 20/1000 mm. Such a fine filtration is necessary in respect of oil for motors having automatically operating fuel valves in which the fuel injection openings may have a width amounting to some hundredths of a millimeter only.

The impurities retained will collect to a great extent in the space 5 and may be easily removed by unscrewing the bottom screw 12 which may also take place while the motor is in operation. Furthermore, the whole filter may be easily cleaned after the parts thereof have been taken apart. The filter plug 2 may be held in place for instance by the engagement of a threaded portion 15 of the plug into corresponding threads formed at the uppermost end of the boring of the casing, as shown, or in any other convenient manner.

Furthermore, the guidance of the plug 2 within the boring of the casing 11 may not necesarily be effected by the two surfaces 3 and 4 but may also be obtained in any other way. In such case the plug may be ground off also at the surfaces 3 and 4, so that filtration will also take place directly between the space 5 and the grooves 10 as well as between the grooves 9 and the space 7.

The shape of the plug 2 and the boring of the casing 1 need not be cylindrical but may be chosen in any different way, as for instance, conical, in which case an adjustment of the width of the filtering air spaces may be obtained by axial relative displacement of the plug and the casing.

To obtain proper filtration it is of importance that the width of the top faces 13 of the partition walls 14 (see Fig. 2) between the grooves 9 and 10 are as small as possible, as otherwise when using certain heavy oils deposit of oil will take place on the limiting surfaces of the air spaces 11 and will prevent the passage of the oil through said air spaces, even if pressures amounting several tens of atmospheres are used. According to this invention the partition walls 14 between the grooves are, therefore, originally formed with a pointed edge so that after the grinding off of said edge the top faces 13 of the partition walls will be but a fractional part of a millimeter.

To obtain the greatest filtering area possible within a predetermined volume one or more small filters may, as shown in Fig. 3, be placed within a larger filter in such a way that the plug of each larger filter is formed with a boring to constitute the casing for receiving the next filter plug. For instance, the arrangement may be such that a rough filtration will take place in the innermost filter from which the oil is caused to pass through narrower outer filters.

What I claim is:—

1. A liquid filter, particularly for filtering fuel oils under high pressure for internal combustion engines, comprising in combination a casing having a boring therein, an inlet and an outlet, a plug fitted in said boring having alternate external grooves connected to said inlet and said outlet, the partition walls between said grooves having ground off edges so as to form narrow air spaces between the grooves and the wall of said boring to constitute filtering passages between adjacent grooves.

2. A liquid filter, particularly for filtering fuel oils under high pressure for internal combustion engines, comprising in combination a casing having a boring therein, an inlet and an outlet leading to and from said boring, respectively, a plug fitted in said boring having alternate longitudinally extending external grooves connected to said inlet and said outlet, the partition walls between such grooves being shaped to form wedges the edges of which are ground off so as to form narrow spaces between adjacent grooves, while the slides of each of such wedges are inclined in such a way that the extensions thereof will meet on the wall of the boring in the casing.

In testimony whereof I have signed my name.

KNUT JONAS ELIAS HESSELMAN.